(12) United States Patent
Johnson et al.

(10) Patent No.: US 7,971,806 B2
(45) Date of Patent: Jul. 5, 2011

(54) POPPET CHECK VALVE FOR AIR-ASSISTED SPRAY GUN

(75) Inventors: Daniel R. Johnson, Blaine, MN (US);
Glen W. Davidson, Roseville, MN (US);
Eric J. Finstad, Rogers, MN (US);
Pamela J. Muetzel, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 207 days.

(21) Appl. No.: 12/346,593

(22) Filed: Dec. 30, 2008

(65) Prior Publication Data

US 2010/0163645 A1 Jul. 1, 2010

(51) Int. Cl.
*B05B 1/28* (2006.01)
(52) U.S. Cl. ........................ 239/296; 239/291
(58) Field of Classification Search ................. 239/291, 239/292, 296, 569–572, 581.1, 581.2, 600, 239/290
See application file for complete search history.

(56) References Cited

U.S. PATENT DOCUMENTS

| | | | |
|---|---|---|---|
| 3,107,858 A | 10/1963 | Ganzel et al. | |
| 3,327,949 A | 6/1967 | Eull | |
| 3,653,592 A | 4/1972 | Cowan | |
| 3,705,689 A * | 12/1972 | Lee | 239/337 |
| 3,915,388 A * | 10/1975 | Nathan | 239/415 |
| 4,174,070 A | 11/1979 | Lau et al. | |
| 4,216,907 A | 8/1980 | Fuller | |
| 4,513,777 A | 4/1985 | Wright | |
| 4,527,740 A | 7/1985 | Gunzel, Jr. et al. | |
| 4,754,923 A | 7/1988 | Matusita et al. | |
| 4,766,927 A | 8/1988 | Conatser | |
| 4,819,878 A * | 4/1989 | Bailey et al. | 239/427 |
| 4,925,101 A | 5/1990 | Konieczynski et al. | |
| 4,934,602 A | 6/1990 | Mattson | |
| 5,054,687 A | 10/1991 | Burns et al. | |
| 5,059,099 A * | 10/1991 | Cyphers | 417/311 |
| 5,067,518 A | 11/1991 | Kosmyna | |
| 5,080,285 A | 1/1992 | Toth | |

(Continued)

FOREIGN PATENT DOCUMENTS

WO 9703758 A2 2/1997

OTHER PUBLICATIONS

The Search Report and Written Opinion of the International Searching Authority in counterpart Application No. PCT/US2009/006667 filed Dec. 22, 2009.

(Continued)

*Primary Examiner* — Davis Hwu
(74) *Attorney, Agent, or Firm* — Kinney & Lange, P.A

(57) ABSTRACT

An air-assisted sprayer comprises a platform, a fluid cup, an air reservoir, a spray cap, a pressure line, a fluid reservoir and a poppet valve. The fluid cup is connected to the platform to hold a volume of fluid. The air reservoir extends through the platform and is configured to receive pressurized air. The spray cap is connected to the platform to receive pressurized air from the air reservoir. The pressure line connects the air reservoir with the fluid cup to pressurize the volume of fluid. The fluid reservoir extends from the fluid cup to the platform to provide pressurized fluid to the spray cap. The poppet valve is in fluid communication with the pressure line between the volume of fluid and the air reservoir to prevent fluid from entering the air reservoir.

17 Claims, 5 Drawing Sheets

U.S. PATENT DOCUMENTS

| | | |
|---|---|---|
| 5,119,992 A | 6/1992 | Grime |
| 5,141,161 A | 8/1992 | Anderson et al. |
| 5,190,219 A | 3/1993 | Copp, Jr. |
| 5,218,993 A | 6/1993 | Steinberg et al. |
| 5,226,600 A | 7/1993 | Frank |
| 5,236,128 A | 8/1993 | Morita et al. |
| 5,284,299 A | 2/1994 | Medlock |
| 5,322,221 A | 6/1994 | Anderson |
| 5,330,108 A | 7/1994 | Grime et al. |
| 5,460,203 A | 10/1995 | Smith et al. |
| 5,529,460 A | 6/1996 | Eihusen et al. |
| 5,711,485 A | 1/1998 | Wheeler |
| 6,019,293 A | 2/2000 | Sweazy et al. |
| 6,019,294 A | 2/2000 | Anderson et al. |
| 6,036,114 A | 3/2000 | Shih |
| 6,461,548 B1 * | 10/2002 | Shine .......................... 264/39 |
| 6,708,900 B1 | 3/2004 | Zhu et al. |
| 6,874,702 B2 * | 4/2005 | Turnbull ..................... 239/526 |
| 6,877,681 B2 | 4/2005 | Hartle et al. |
| 6,955,724 B2 | 10/2005 | Dankert |
| 2005/0011968 A1 * | 1/2005 | Tracey et al. ............... 239/195 |
| 2008/0087741 A1 | 4/2008 | Le Louarn et al. |

OTHER PUBLICATIONS

Graco Inc. Fine Finish Solutions product brochure.
Graco Inc. Instructions-Parts List for HVLP—Turbine Gun.

* cited by examiner

POPPET CHECK VALVE FOR AIR-ASSISTED SPRAY GUN

CROSS-REFERENCE TO RELATED APPLICATION(S)

The present application is related to the following co-pending applications filed on the same day as this application: "INTEGRATED FLOW CONTROL ASSEMBLY FOR AIR-ASSISTED SPRAY GUN" by inventors D. Olson, D. Johnson, and P. Muetzel (U.S. patent application Ser. No. 12/346,579.

BACKGROUND

The present invention relates to spray guns for applying coatings, and, in particular to air controls for high volume, low pressure (HVLP) spray guns. HVLP guns are commonly used to apply finish coats to painted or varnished products. As such, it is desirable that the coating be applied in an even and consistent manner. HVLP guns use air supplied by an external turbine to apply a fluid coating that hardens into a finish. Specifically, the HVLP gun is provided with a container for storing the fluid coating, while the external turbine supplies pressurized air to the gun to pressurize the container and to provide an atomization air jet in which the pressurized fluid is sprayed. A check valve is positioned between the container and the gun to prevent fluid from migrating backward into the gun after the pressure in the container drops. Conventional check valves are connected to a pressure line connecting the container with the gun. For example, a duckbill check valve, which comprises a rubber tube having a flat end, is positioned inside of the container where the pressure line enters. Duckbill check valves, however, produce pressure loss in the pressure line, which is particularly undesirable in low pressure spray guns. Also, duckbill check valves are quite easily clogged, requiring frequent replacement and disassembly of the spray gun container. Other check valve designs are incorporated into the pressure line outside of the container. Such check valves, however, produce significant pressure drops in addition to being small and difficult to clean. There is, therefore, a need for an improved check valve for use in HVLP spray guns.

SUMMARY

The present invention is directed to an air-assisted sprayer comprising a platform, a fluid cup, an air reservoir, a spray cap, a pressure line, a fluid reservoir and a poppet valve. The fluid cup is connected to the platform to hold a volume of fluid. The air reservoir extends through the platform and is configured to receive pressurized air. The spray cap is connected to the platform to receive pressurized air from the air reservoir. The pressure line connects the air reservoir with the fluid cup to pressurize the volume of fluid. The fluid reservoir extends from the fluid cup to the platform to provide pressurized fluid to the spray cap. The poppet valve is in fluid communication with the pressure line between the volume of fluid and the air reservoir to prevent fluid from entering the air reservoir.

DETAILED DESCRIPTION

Figure 1:
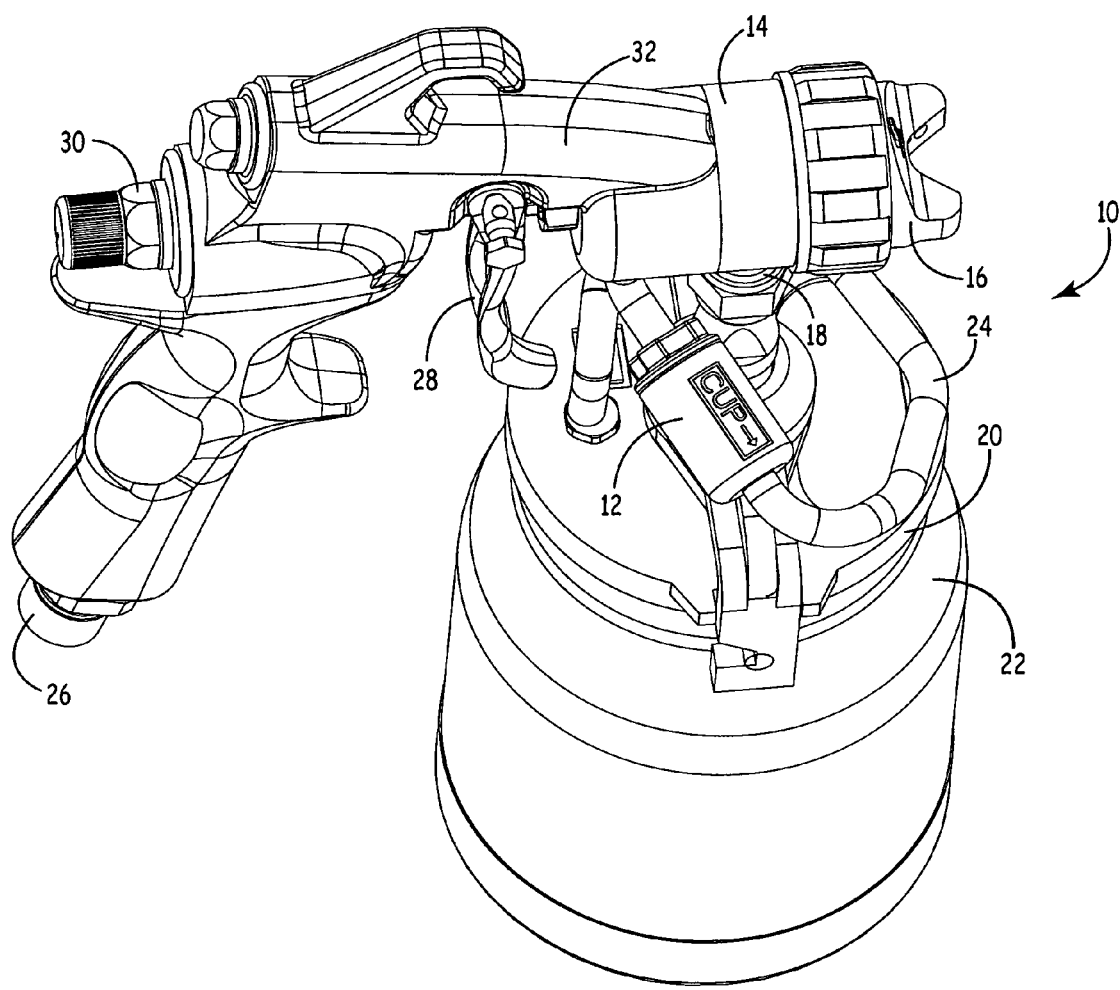
FIG. 1 shows a perspective view of an air-assisted spray gun having a poppet check valve of the present invention.

FIG. 1 shows a perspective view of air-assisted spray gun 10 having poppet check valve 12 of the present invention. In the embodiment shown, air-assisted spray gun 10 comprises a high volume, low pressure (HVLP) spray gun. Spray gun 10 also includes nozzle housing 14, spray cap 16, fluid coupling 18, fluid lid assembly 20, fluid cup 22, pressure line 24, air coupling 26, trigger 28 and trigger lock 30, which are mounted to platform 32. During operation, fluid cup 22 is provided with a fluid that is desired to be sprayed from spray gun 10. For example, fluid cup 22 is filled with a paint or varnish that is fed to nozzle housing 14 through fluid lid assembly 20 and fluid coupling 18. Air coupling 26 connects to a source of pressurized air. Typically, HVLP spray guns are connected to portable turbines that provide a high volume of air at a low pressure to coupling 26, such as through a hose. For example, a typical HVLP turbine is capable of providing approximately 58 cubic feet per minute (cfm) [~1642 liters per minute (lpm)] of air at 5 pounds per square inch (psi) [~34.5 kiloPascals (kPa)]. Pressurized air provided to air coupling 26 flows through an air reservoir within platform 14 to spray cap 16 and to pressure line 24. The pressurized air flows through pressure line 24, check valve 12 and fluid lid assembly 20 into fluid cup 22. The pressurized air forces fluid out of cup 22 and into fluid coupling 18 and into a fluid reservoir within nozzle housing 14. Within nozzle housing 14, the forced fluid is discharged from a fluid nozzle and infused into the pressurized air within spray cap 16. The fluid becomes atomized and expelled from gun 10 through a discharge orifice disposed in cap 16. Trigger 28 is mounted to platform 32 to engage with a flow control valve that enables volumes of the pressurized air and fluid to be discharged from the discharge orifice. Trigger lock 30 restricts movement of trigger 28 such that gun 10 can be set to desired maximum discharge volumes. Check valve 12 prevents fluid from migrating backward into the air reservoir within platform 32 when, for example, gun 10 is tipped so as to allow fluid within cup 22 to enter pressure line 24.

Figure 2:
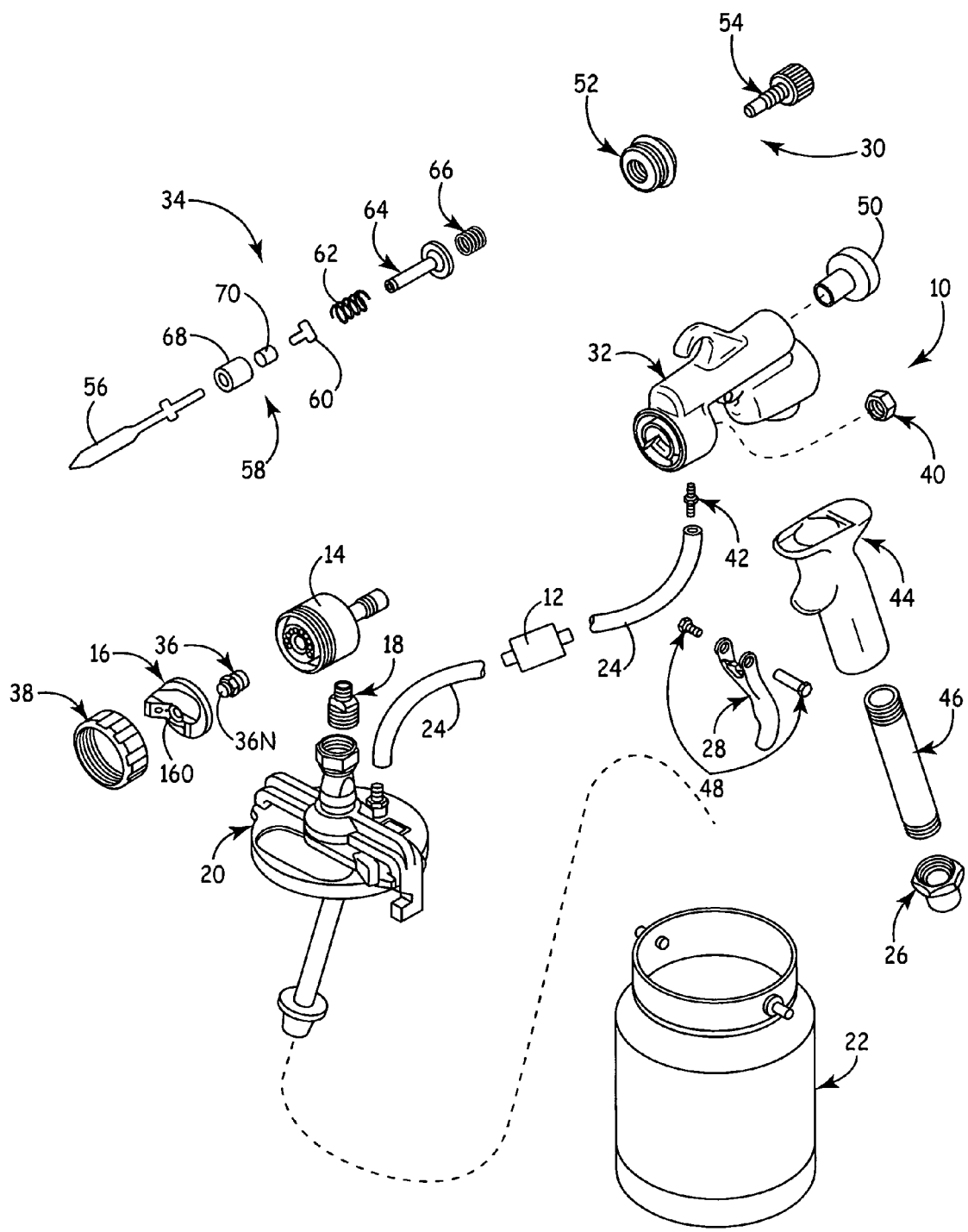
FIG. 2 shows an exploded view of the air-assisted spray gun of FIG. 1 including the poppet check valve.

FIG. 2 shows an exploded view of spray gun 10, including check valve 12, nozzle housing 14, spray cap 16, fluid coupling 18, fluid lid assembly 20, fluid cup 22, pressure line 24, air coupling 26, trigger 28, trigger lock 30 and platform 32, as shown in FIG. 1. Spray gun 10 also includes integrated flow control assembly 34, spray nozzle 36, retention ring 38, retention nut 40, air stem 42, handle 44, air tube 46, trigger pin assembly 48 and air cap 50. Trigger lock 30 includes retainer 52 and stop 54. Integrated flow control assembly 34 includes fluid valve 56, calibration mechanism 58, spacer 60, fluid spring 62, air valve 64 and air spring 66. Calibration mechanism 58 includes trigger ring 68 and calibration bushing 70.

Air coupling 26 is configured to connect to a source of pressurized air and a first end of air tube 46. Air tube 46 is inserted through handle 44, which connects to platform 32. A second end of air tube 46 connects to platform 32 to provide pressurized air to gun 10. Air cap 50 seals platform 32 such that pressurized air is prevented from escaping platform 32. Nozzle housing 14 and air stem 42 mount to platform 32 to receive pressurized air from air tube 46. Nozzle housing 14 inserts through a portion of platform 32 and is secured with retention nut 40, while air stem 42 threads into an opening in platform 32. Pressure line 24 fluidly connects air stem 42 with fluid lid assembly 20. Fluid lid assembly 20 is configured to pressurize cup 22 and force a fluid into coupling 18. Spray nozzle 36 connects to nozzle housing 14 to receive pressurized fluid from fluid coupling 18. Using retention ring 38, spray cap 16 connects to nozzle housing 14 to cover spray nozzle 36. Spray cap 16 includes discharge orifice 16O that receives pressurized air from nozzle housing 16 and pressurized fluid from fluid nozzle 36N of spray nozzle 36. Integrated flow control assembly 34 connects to platform 32 to interact with nozzle housing 14, trigger 28 and air tube 46. Trigger 28, which secures to platform 32 with trigger pin assembly 48, interacts with fluid valve 56 and air valve 64 to open fluid and air reservoirs within platform 32. Retainer 52 and stop 54 of trigger lock 32 and spacer 60 of assembly 34 limit the movement of fluid valve 56 and air valve 64 to control volumetric flows of fluid and air through gun 10. Springs 62 and 66 bias fluid valve 56 and air valve 64, respectively, to a forward or closed position. Trigger ring 68 and calibration bushing 70 of calibration mechanism 58 adjust the position at which air valve 64 engages trigger 28. Thus, using trigger lock 30 and integrated flow control assembly 34, spray gun 10 can be toggled between a locked, or no-flow, configuration and an unlocked, or flow, configuration.

Check valve 12 controls flow of fluids between cup 22 and platform 32. In the embodiment shown, check valve 12 is spliced directly into pressure line 24. In other embodiments, check valve 12 can be connected in between pressure line 24 and air stem 42 or fluid lid assembly 20. In yet other embodiments, check valve 12 can be connected to lid assembly 20 from within cup 22, or to air stem 42 from within platform 32. In any embodiment, check valve 12 is fluidly integrated into gun 10 such that pressurized air from platform 32 is permitted to enter cup 22, but fluid from cup 22 is prevented from entering platform 32. Operation of gun 10 and check valve 12 is described with reference to FIGS. 3-5 in which check valve 12 is spliced into pressure line 24.

Figure 3:
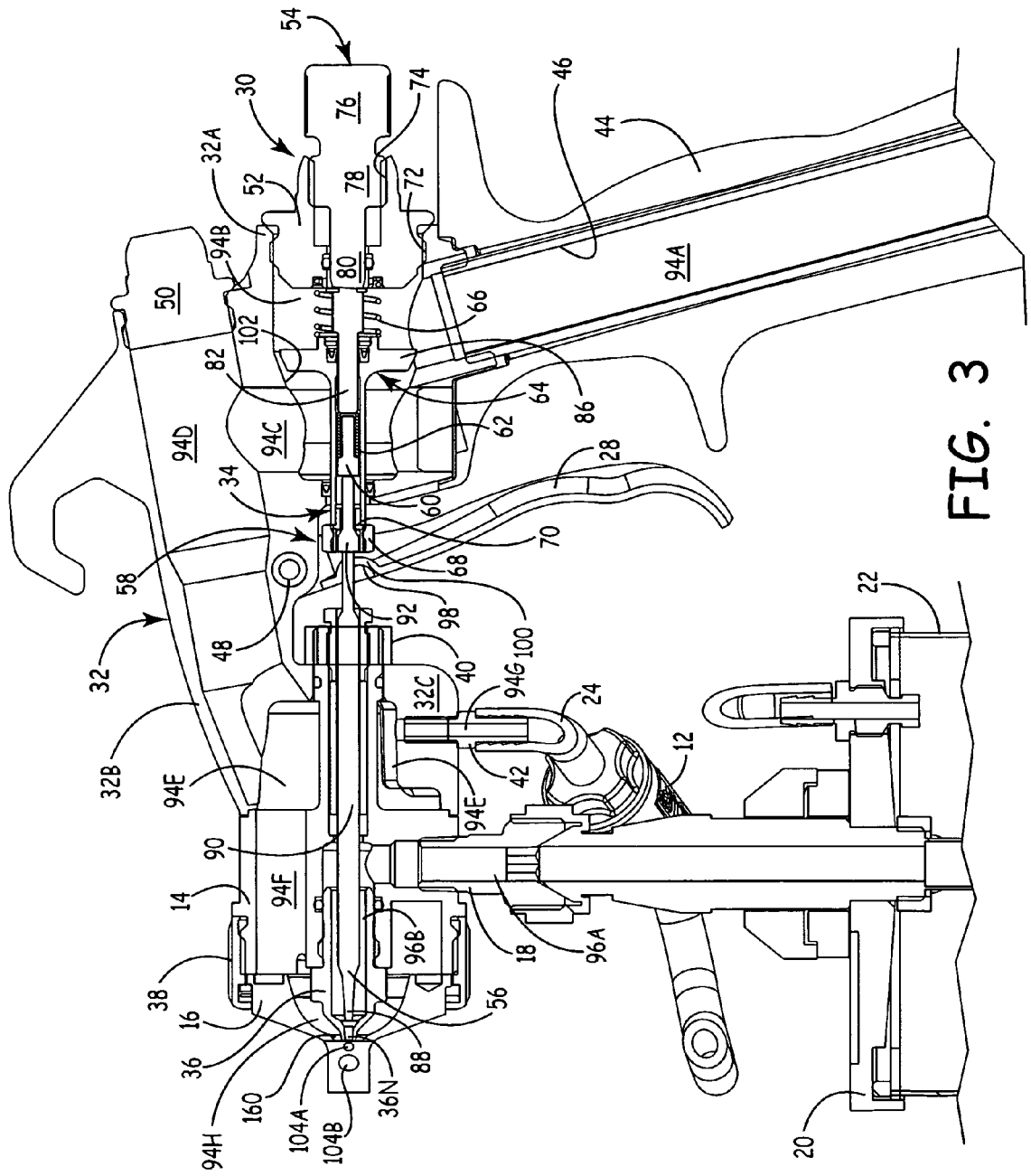
FIG. 3 shows a cross-sectional view of the air-assisted spray gun of FIG. 1 wherein air flow through the poppet check valve is diagramed.

FIG. 3 shows a cross section of spray gun 10 taken at section 3-3 of FIG. 1. FIG. 3 shows spray gun 10 in a flow configuration in which air and fluid flow through platform 12 is enabled by integrated flow control assembly 34. Spray gun 10 includes nozzle housing 14, spray cap 16, discharge orifice 16O, fluid coupling 18, fluid lid assembly 20, fluid cup 22, pressure line 24, air coupling 26, trigger 28, trigger lock 30, platform 32, integrated flow control assembly 34, spray nozzle 36, fluid nozzle 36N, retention ring 38, retention nut 40, air stem 42, handle 44, air tube 46, trigger pin assembly 48 and air cap 50. Trigger lock 30 includes retainer 52 and stop 54. Integrated flow control assembly 34 includes fluid valve 56, calibration mechanism 58, spacer 60, fluid spring 62, air valve 64 and air spring 66. Calibration mechanism 58 includes trigger ring 68 and calibration bushing 70. Retainer 52 comprises an annular body having outer diameter 72 for engaging platform 32, and inner diameter bore 74 for receiving stop 54. Stop 54 includes knob 76, threaded segment 78, air stop 80 and fluid stop 82. Air valve 64 includes annular structure 84 and flange 86. Fluid valve 56 includes valve tip 88, shaft 90 and actuation flange 92.

Platform 32 includes three generally horizontally extending portions: air valve portion 32A, air chamber 32B and fluid valve portion 32C. Handle 44 and air tube 46 extend from air valve portion 32A, and nozzle housing 14 and air cap 16 extend from fluid valve portion 32C such that air reservoir segments 94A-94H, and fluid reservoir segments 96A-96B extend through spray gun 10. Air valve portion 32A and fluid valve portion 32C extend generally parallel to and beneath air chamber 32B such that air valve portion 32A and fluid valve portion 32C are disposed opposite each other. Trigger 28 is suspended from air chamber 32B in a core portion of platform 32 between air valve portion 32A and fluid valve portion 32C. Trigger 28 includes bore 98 through which fluid valve 56 extends. Trigger 28 also includes shoulder 100 against which fluid valve 56 and trigger ring 68 engage to move fluid valve 56 and air valve 64 when trigger 28 is actuated. Fluid valve 56 extends generally horizontally through fluid valve portion 32C, and air valve 64 extends generally horizontally through air valve portion 32A. Integrated flow control assembly 34 extends between fluid reservoir segment 96B and air reservoir segment 94B to engage trigger 28. Integrated flow control assembly 34 links trigger 28 to fluid valve 56 and air valve 64 within the core of platform 32 to control air flow through air reservoir segments 94A-94H and to control fluid flow through fluid reservoir segments 96A-96B. Specifically, trigger 28 is actuated to retract fluid valve 56 and air valve 64 to open spray orifice 36 and air reservoir segment 94B, respectively. Check valve 12 allows pressurized air from air reservoir 94G to enter cup 22, but prevents fluid from within cup 22 from migrating into air reservoir 94G when trigger 28 is released and cup 22 is no longer pressurized.

Air coupling 26 is connected to air tube 46, which includes air reservoir segment 94A. Air tube 46 is inserted into handle 44 and connects to air reservoir segment 94B. Retainer 52 comprises an annular structure having outer diameter 72 threaded into air reservoir segment 94B of handle portion 12A, and inner diameter bore 74 for receiving stop 54. Stop 54, which includes knob 76, threaded segment 78, air stop 80 and fluid stop 82, extends into retainer 52 such that air stop 80 and fluid stop 82 also extend into air reservoir segment 94B. Threaded segment 78 of stop 54 is threaded into retainer 52 such that stop 54 and retainer 52 remain stationary with respect to platform 12 when trigger 28 is actuated. Air valve 64, which comprises annular structure 84 and flange 86, is slipped over needle stop 82 of stop 54 such that flange 86 engages valve seat 102 of air reservoir segment 94B. Annular structure 84 extends completely through air reservoir segment 94B and out of platform 32 into the core of platform 32. Spacer 60 is disposed within annular structure 84 to abut fluid stop 82 of stop 54. Needle spring 62 is disposed between spacer 60 and fluid stop 82. Calibration mechanism 58 is rigidly fixed to annular structure 84 of air valve 64 such that mechanism 58 extends outside of platform 32. Calibration mechanism 58 includes an opening to receive fluid valve 56. Fluid valve 56 is inserted into calibration mechanism 58 and annular structure 84 to engage spacer 60. Fluid valve 56 extends from calibration mechanism 58 and into the core of platform 32 where actuation flange 92 extends radially from fluid valve 56. From actuation flange 92, fluid valve 56 continues into retention nut 40 at fluid chamber 32C within platform 32. Fluid valve 56 extends into nozzle housing 14 and through fluid reservoir segment 96B to engage fluid nozzle 36N of spray nozzle 36.

Knob 76 is rotated to retract threaded segment 78 from retainer 52. Thus, stop 54 is backed out of retainer 52 a fixed distance that correspondingly increases the distance between air stop 80 and valve seat 102, and the distance between fluid stop 82 and spray nozzle 36. Knob 76 is rotated to retract threaded segment 78 from retainer 52. Thus, stop 54 is backed out of retainer 52 a fixed distance that correspondingly increases the distance between air stop 80 and valve seat 102, and the distance between fluid stop 82 and spray nozzle 36. As such, the space between valve stop 82 and fluid valve 56 is increased to a distance greater than the length of spacer 60.

Fluid spring 62 pushes spacer 60 away from fluid stop 82, against fluid valve 56. Likewise, air spring 66 pushes air valve 64 away from retainer 52, against trigger 28. Thus, play is produced within integrated flow control assembly 34, the slack of which is taken up by actuation of trigger 28, and the corresponding compression of springs 62 and 66. Trigger 28 is pivoted about trigger pin assembly 48 to be brought closer to handle 44. Shoulder 100 of trigger 28 engages trigger ring 68 that, through bushing 70, pushes air valve 64 toward stop 54. Shoulder 100 also engages actuation flange 92 to push fluid valve 56 toward stop 54. Thus, valve tip 88 is pulled away from fluid nozzle 36N and valve flange 86 is pulled away from valve seat 102. Operation of integrated flow control mechanism 34 is described in further detail in the related application entitled "INTEGRATED FLOW CONTROL ASSEMBLY FOR AIR-ASSISTED SPRAY GUN" by inventors D. Olson, D. Johnson, and P. Muetzel, which is incorporated by this reference.

Pressurized air from air coupling 26 is enters handle 44 through air reservoir segment 94A and continues into platform 32 at air reservoir segment 94B. Valve flange 86 is retraced from valve seat 102 such that the pressurized air is permitted to flow from air reservoir segment 94B into air reservoir segment 94C. Valve flange 86 and valve seat 102 are contoured to permit varying volumetric flow rates of pressurized air into air reservoir segment 94C, depending on the length over which trigger 28 is actuated. From segment 94C, the pressurized air travels through air reservoir segment 94D within air chamber 32B and into air reservoir segment 94E within fluid valve portion 32C. From segment 94E, the pressurized air splits to flow into spray cap 16 and segment 94G. From within spray cap 16, the pressurized air is discharged from gun 10 through spray orifice 16O. Additionally, depending on the position of spray cap 16, air is permitted to flow out of orifices 104A and 104B to shape discharged flow emitted from gun 10. From air reservoir segment 94G, pressurized air flows through air stem 42, pressure line 24, check valve 12 and fluid cap 20 to pressurize cup 22. In one embodiment, cup 22 is pressurized to a maximum pressure of about 3 psi (~20.68 kPa), although the pressure within cup 22 slightly varies depending on the position of trigger 28. Fluid within cup 22 is thereby forced into fluid coupling 20 and into fluid reservoir segments 96A and 96B. Within fluid reservoir segment 96B, the pressurized fluid is pushed into spray nozzle 36N. Valve tip 88 is contoured to permit varying volumetric flow rates of pressurized fluid out of fluid nozzle 36N, depending on the length over which trigger 28 is actuated. From spray nozzle 36, the pressurized fluid enters spray cap 16 whereby the pressurized fluid is entrained with pressurized air from air reservoir segment 94F and discharged from gun 10.

Check valve 12 comprises an in-line poppet valve configured to be easily removed from gun 10, disassembled and cleaned. Specifically, check valve 12 can be disconnected from pressure line 24 and opened without the use of tools to expose a spring-actuated poppet assembly. Thus, accumulated liquid, encrusted fluid, debris or the like can be removed, and valve 12 can be reassembled and connected to gun 10 for reuse in an expedient fashion.

Figure 4:
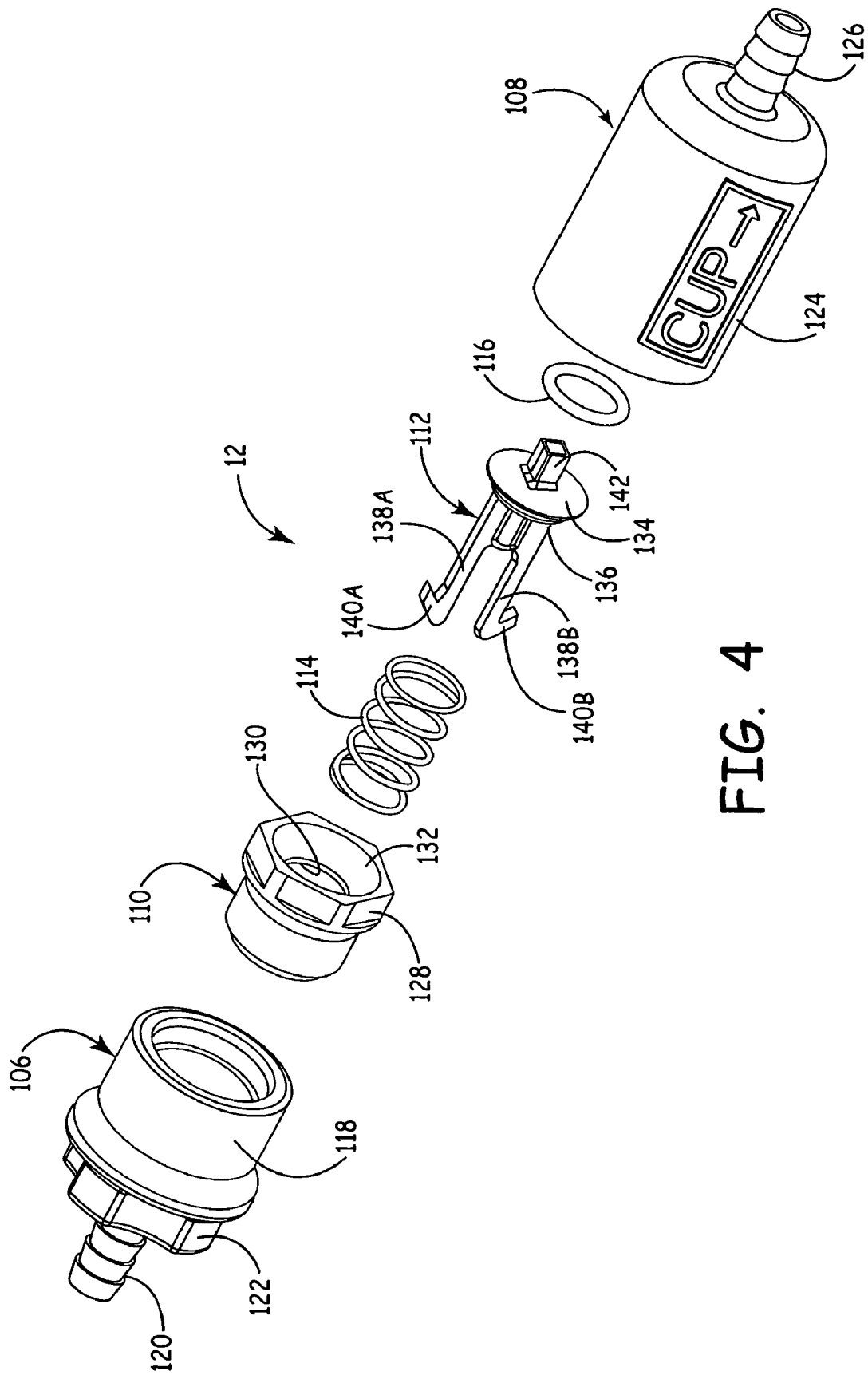
FIG. 4 shows an exploded view of a poppet check valve of the present invention.

FIG. 4 shows an exploded view of in-line poppet valve 12 of FIG. 1. Check valve 12 comprises first housing 106, second housing 108, valve seat 110, poppet 112, valve spring 114 and O-ring 116. First housing 106 comprises first annular structure 118, first barbed fitting 120 and knob 122. Second housing 108 comprises second annular structure 124 and second barbed fitting 126. Valve seat 110 comprises an annular body having flats 128, interior shoulder 130, and poppet seat 132. Poppet 112 comprises poppet head 134, seal channel 136, resilient members 138A and 138B, hooks 140A and 140B and nub 142.

First housing 106, second housing 108, valve seat 110, poppet 112 and valve spring 114 are comprised of materials that are resistant to chemical cleaning agents, such as solvents, so that check valve 12 can be readily cleaned. In one embodiment housing 106, housing 108, poppet 112 and valve seat 110 are comprised of Nylon 66, valve spring 114 is comprised of 17-7 stainless steel, and O-ring 116 is comprised of Buna-N.

Housing 106 and housing 108 comprise cup-like structures that fit together to form a cylinder for receiving poppet 112. For example, annular structure 118 comprises external threads and annular structure 124 includes mating internal threads such that structure 118 can be threaded into structure 120. Knob 122 on housing 106 includes contours that provide a means for facilitating assembly and disassembly of housing 106 and housing 108. Knob 122 is shaped to be easily gripped such that valve 12 can be disassembled without the use of tools. Barbed fittings 120 and 126 extend linearly from housings 106 and 108, respectively, along a common axis that extends through the cylinder formed by structures 118 and 124. Barbed fittings 120 and 126 are configured to receive hosing that comprises fluid line 24, and include ribs, hooks or other protrusions that prevent the hosing from slipping off of fittings 120 and 126.

Valve seat 110 is comprises an annular structure having external threads configured to engage mating internal threads on first annular structure 118. Flats 128 provide a means for facilitating assembly and disassembly of valve seat 110 from structure 118. Flats 128 are shaped so as to receive a common tool, such as a wrench, to facilitate tight connection with structure 118. Valve seat 110, however, can be hand tightened for easy disassembly from structure 118 so that cleaning of poppet 112 can be facilitated. Valve seat 110 includes a central bore configured to receive poppet 112. The central bore includes shoulder 130 for engaging spring 114, and poppet seat 132 for engaging poppet head 134.

Poppet head 134 comprises a disk like structure having a curved surface shaped to fit into poppet seat 132. The curved surface includes seal channel 136 that is configured to receive O-ring 136. Resilient members 138A and 138B extend linearly from head 134 so as to extend axially into the central bore of valve seat 110. Resilient members 138A and 138B are flexible to permit hooks 140A and 140B to enter valve seat 110. Spring 114 is positioned between hooks 140A and 140B and shoulder 130 within valve seat 110. Nub 142 extends axially from poppet head 134 and provides a handle for grasping to pull poppet 112 from valve seat 110 to facilitate cleaning after valve 12 has been fouled or plugged during usage.

Figure 5:
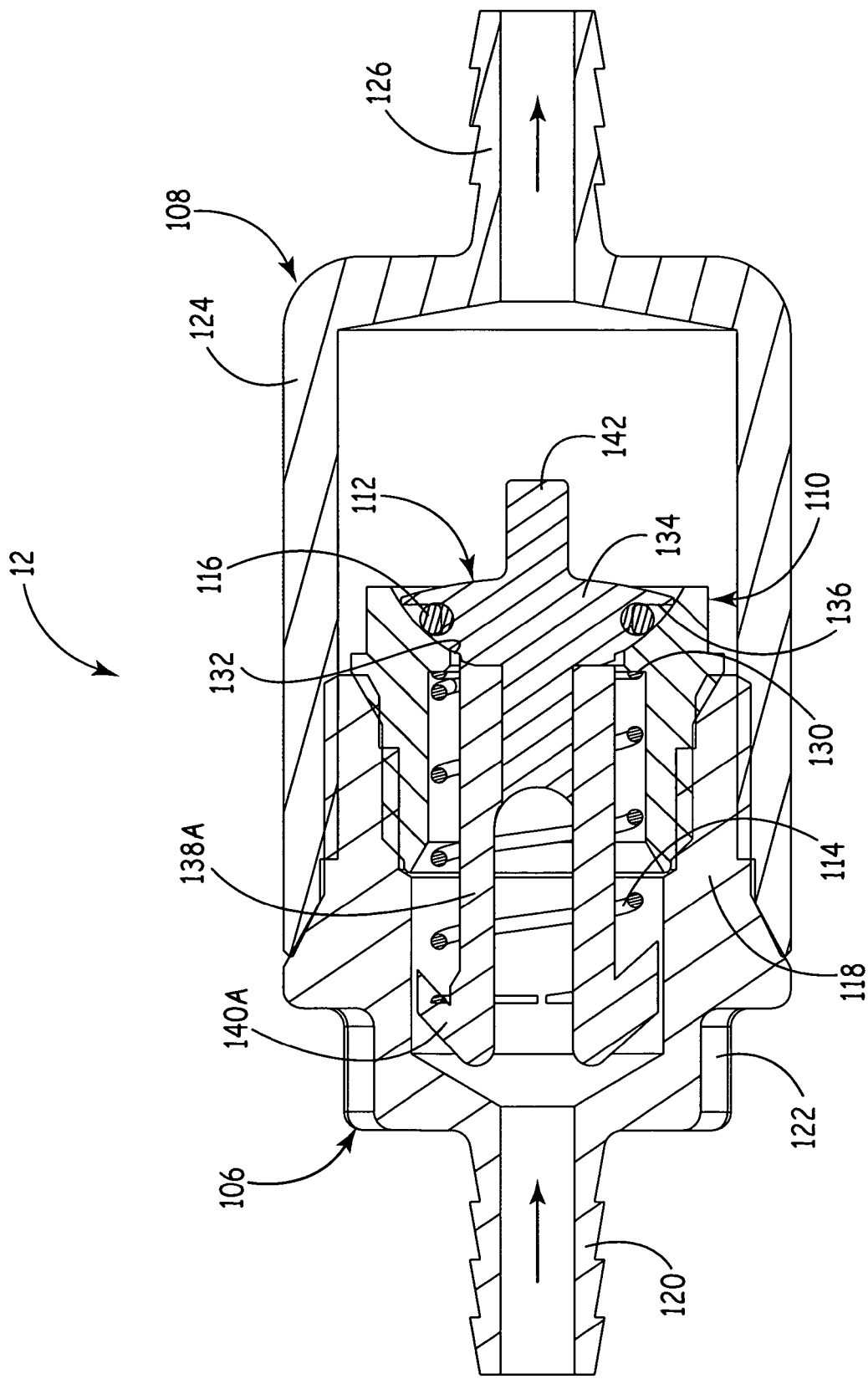
FIG. 5 shows a cross-sectional view of a poppet check valve of the present invention.

FIG. 5 shows a cross-sectional view of in-line poppet valve 12 of FIG. 1 as assembled in usage. Check valve 12 includes first housing 106, second housing 108, valve seat 110, poppet 112, valve spring 114 and O-ring 116. Annular structure 118 of housing 106 is threaded into annular structure 124 of housing 108 such that a generally cylindrical valve chamber is formed for poppet 112. Barbed fittings 120 and 126 extend axially from housings 106 and 108, respectively, such that a linear flow path is produced across valve 12.

Poppet 112 is inserted into a center bore within valve seat 110 such that resilient members 138A and 138B extend through valve seat 110 and hooks 140A and 140B extend generally radially out from resilient members 138A and 138B. O-ring 116 is positioned within seal channel 136 and poppet is fully inserted into valve seat 110 such that poppet head 134 is seated within poppet seat 132. Spring 114 is fitted over resilient members 138A and 138B, which flex to accommodate insertion into spring 114. Hooks 140A and 140B slope axially back toward valve poppet head 134 to restrain spring 114. As such, spring 114 is disposed between hooks 140A and 140B and shoulder 130 of valve seat 110. Valve seat 110 is threaded into annular structure 118 such that the center bore within valve seat 110, spring 114 and poppet 112 are co-axially disposed between barbed fittings 120 and 126. Barbed fittings 120 and 126 connect with pressure line 24 so that pressurized air from air reservoir segment 94E of platform 32 can be provided to fluid cup 22 when trigger 28 is actuated, as shown in FIG. 3.

FIG. 5 shows check valve 12 in a no-flow configuration where poppet 112 is fully seated within valve seat 110. Poppet 112 is fully seated when no pressure differential is applied across valve 12, such as when trigger 28 is not actuated. As such, spring 114 pushes hooks 140A and 140B away from shoulder 130 through resilient members 138A and 138B until poppet head 134 is fully seated within poppet seat 132. When fully seated, seal channel 136 is closed off by poppet seat 132 such that O-ring 116 seals between valve seat 110 and poppet 112. Thus, any fluid or air within annular structure 124 is prevented from entering annular structure 118 even if the pressure within annular structure 118 increases above the pressure within annular structure 124. When pressure within annular structure 118 increases above that of the pressure within annular structure 124, such as when trigger 28 is pulled to permit pressurized air from gun 10 into barbed fitting 120 through pressure line 24, poppet 112 is axially displaced from valve seat 110 to break the seal provided by O-ring 116. Thus, flow from annular structure 118 to annular structure 124 is permitted, and pressurized air is permitted to enter cup 22. Spring 114 provides only enough spring force to maintain poppet 112 in a closed position so as to not unnecessarily increase the pressure drop across check valve 12.

When trigger 28 is actuated, cup 22 is pressurized based on the volumetric flow rates of air entering and leaving cup 22. However, pressure losses are also accumulated from flow of the air through the various components of gun 10. Specifically, check valve 12 comprises a flow restriction that produces pressure losses. Check valve 12 produces very little pressure loss within cup 22 as compared to previous designs, such as the duckbill check valve. In one embodiment of gun 10, if no check valve is provided between platform 32 and cup 22, pressure within cup 22 reaches a maximum of approximately 2.856 psi (~19.69 kPa). Using a conventional duckbill check valve, maximum pressure within cup 22 drops to approximately 1.451 psi (~10.00 kPa), which represents a pressure drop of approximately fifty percent. However, with check valve 12 of the present invention, maximum pressure within cup 22 drops to only approximately 2.62 psi (~18.06 kPa), which represents a pressure drop of approximately ten percent. With check valve 12, gun 10 more efficiently delivers pressurized air to cup 22 such that pressurized fluid within cup 22 can be delivered to fluid nozzle 36N at higher pressures. Thus, more pressure is provided to nozzle 36N to better atomize sprayed fluid over a range of fluid volumes, such as is controlled by trigger 28 and integrated flow control assembly 34. For example, too small a volume of pressurized air, caused by under pressurization of cup 22, may cause blotchy finishes.

During spraying operations, it is often necessary to tilt gun 10 in such an orientation that fluid within cup 22 is directed to flowing into pressure line 24. So long as trigger 28 is actuated and pressurized air is flowing into cup 22, no fluid will enter pressure line 24. When trigger 28 is released, however, fluid within cup 22 is free to enter pressure line 24. Check valve 12 interrupts the flow of fluid within pressure line 24 to inhibit passage into platform 32. The fluid, such as paint or varnish, accumulates or builds on valve seat 110 and poppet 112. The fluid can become dried and crusted on poppet 112 and poppet seat 132 to inhibit operation of check valve 12. Check valve 12 can be removed from gun 10 for cleaning by pulling pressure line 24 from barbed fittings 120 and 126. Housing 108 is then unthreaded from housing 106 to expose poppet 112 so that check valve 12 can be cleansed with a solvent to dissolve the dried fluid. Nub 142 can be pulled to dislodge poppet head 134 from poppet seat 132 to facilitate entry of solvent into valve seat 110. Valve seat 110 can be unthreaded from within housing 106 to access spring 114 and resilient members 138A and 138B. Finally, if needed, poppet 112 can be removed from valve seat 110 to completely disassemble valve 12.

Check valve 12 provides spray gun 10 with a high performance, easy to maintain valve that prevents unwanted fluids from entering air reservoir 94E within platform 32. Using a poppet assembly, check valve 12 produces low pressure losses within gun 10 such that spraying of fluid is optimally performed. Check valve 12 is easily removed from gun 10 such that prolonged interruption of operation of gun 10 is avoided. For example, check valve 12 is spliced into pressure line 24 and connected by barbed fittings 120 and 126 so that gun 10 need not be disassembled. Disassembly of check valve 12 is easy to facilitate rapid cleaning and reuse, avoiding unnecessary expense of replacing disposable check valves.

Although the present invention has been described with reference to preferred embodiments, workers skilled in the art will recognize that changes may be made in form and detail without departing from the spirit and scope of the invention.

The invention claimed is:

1. An air-assisted sprayer comprising:
   a platform;
   a fluid cup connected to the platform to hold a volume of fluid;
   an air reservoir extending through the platform and configured to receive pressurized air;
   a spray cap connected to the platform to receive pressurized air from the air reservoir;
   a pressure line connecting the air reservoir with the fluid cup to pressurize the volume of fluid;
   a fluid reservoir extending from the fluid cup to the platform to provide pressurized fluid to the spray cap; and
   a poppet valve in fluid communication with the pressure line between the volume of fluid and the air reservoir to prevent fluid from entering the air reservoir, wherein the poppet valve comprises:
      a first housing comprising:
         a first fitting for connecting to the pressure line; and
         a first body extending from the first fitting;
      a second housing comprising:
         a second fitting for connecting to the pressure line; and
         a second body extending from the second fitting and connected to the first body to define a valve cylinder extending between the first and second fittings; and
      a spring-actuated poppet assembly disposed within the valve cylinder to permit on-way fluid flow, the spring-actuated poppet assembly comprising:
         a valve seat threaded into the first housing, the valve seat comprising:
            a central bore;
            a shoulder disposed within the central bore; and
            a poppet seat disposed adjacent the central bore;

a poppet comprising:
  a poppet head configured to rest within the poppet seat;
  a seal channel extending into the poppet head;
  a resilient member extending from the poppet head through the central bore; and
  a hook extending from the resilient member;
an o-ring disposed within the seal channel; and
a valve spring disposed between the hook and the shoulder.

2. The air-assisted sprayer of claim 1 wherein the poppet valve is manually removable from the sprayer without the use of tools.

3. The air-assisted sprayer of claim 2 wherein the poppet valve is configured to be manually disassembled to clean fluid from within the poppet valve.

4. The air-assisted sprayer of claim 3 wherein the poppet valve is carried by the pressure line between the fluid reservoir and the cup.

5. The air-assisted sprayer of claim 4 wherein the poppet valve is spliced into the pressure line.

6. The air-assisted sprayer of claim 1 wherein the poppet valve includes contours or flats to facilitate manual unthreading of components.

7. The air-assisted sprayer of claim 1 wherein the first housing, the second housing, the valve seat and the poppet are comprised of a solvent-resistant material.

8. The air-assisted sprayer of claim 6 wherein the poppet includes a nub extending axially from the poppet head away from the valve seat.

9. The air-assisted sprayer of claim 1 wherein the first and second fittings are barbed.

10. The air-assisted sprayer of claim 1 wherein the poppet valve produces a pressure drop in the fluid cup of less than approximately ten percent.

11. An air-assisted spray gun comprising:
a platform;
a fluid cup connected to the platform to hold a volume of a fluid;
a trigger pivotably mounted to the platform;
a fluid reservoir extending through the platform, the fluid reservoir comprising:
  a coupling for receiving a source of pressurized fluid from the fluid cup at a first end of the fluid reservoir; and
  a fluid nozzle disposed at a second end of the fluid reservoir;
an air reservoir extending through the platform to intersect the fluid reservoir, the air reservoir comprising:
  a coupling for receiving a source of pressurized air at a first end of the air reservoir;
  a discharge orifice disposed at a second end of the reservoir concentric with the fluid nozzle; and
  a fluid segment for providing pressurized air from the air reservoir to the fluid cup;
a valve positioned within the platform to intersect the air reservoir and the fluid reservoir and to engage the trigger; and
a check valve connected to the fluid segment between the volume of fluid and the air reservoir, the check valve comprising:
  a first housing comprising:
    a first fitting for connecting to the fluid segment; and
    a first annular body extending axially from the first fitting;
  a second housing comprising:
    a second fitting for connecting to the fluid segment; and
    a second annular body extending axially from the second fitting and threaded onto the first annular body to define a valve cylinder extending axially between the first and second fittings; and
  a spring-actuated poppet assembly disposed within the valve cylinder to permit one-way fluid flow, the spring-actuated poppet assembly comprising:
    a valve seat threaded into the first annular housing, the valve seat comprising:
      a central bore;
      a shoulder disposed within the central bore; and
      a poppet seat disposed adjacent the central bore;
    a poppet comprising:
      a poppet head configured to rest within the poppet seat;
      a seal channel extending into the poppet head;
      a resilient member extending from the poppet head through the central bore; and
      a hook extending from the resilient member;
    an o-ring disposed within the seal channel; and
    a valve spring disposed between the hook and the shoulder.

12. The air-assisted spray gun of claim 11 wherein the check valve comprises a poppet valve removable from the fluid segment without the use of tools and is configured to be manually disassembled to clean fluid form within the poppet valve.

13. The air-assisted sprayer of claim 12 and further comprising a pressure line connecting the fluid segment with the fluid cup, wherein the check valve is spliced into the pressure line.

14. The air-assisted sprayer of claim 11 wherein the first housing, the second housing, the valve seat and the poppet are comprised of a solvent-resistant material.

15. The air-assisted sprayer of claim 11 wherein the poppet valve produces a pressure drop in the fluid cup of less than approximately ten percent.

16. The air-assisted sprayer of claim 1 wherein:
the first body is annular and extends axially from the first fitting; and
the second body is annular and extends axially from the second fitting;
wherein the second body is threaded onto the first body such that the valve cylinder extends axially between the first body and the second body.

17. An air-assisted spray system comprising:
a platform;
a container for holding a volume of fluid;
an air inlet connected to the platform and configured to receive pressurized air from an air source;
a spray nozzle connected to the platform to receive pressurized air from the air inlet;
a pressure line connected to the container and configured to receive pressurized air from the air source to pressurize the volume of fluid;
a fluid reservoir extending from the container to the platform to provide pressurized fluid to the spray nozzle; and
a poppet valve assembly comprising:
  a valve cylinder in fluid communication with the pressure line between the volume of fluid and the air source; and
  a spring-actuated poppet disposed within the valve cylinder to prevent fluid in the container from traveling to the air source, the spring-actuated poppet assembly comprising:

a valve seat threaded into the valve cylinder, the valve seat comprising:
- a central bore;
- a shoulder disposed within the central bore; and
- a poppet seat disposed adjacent the central bore;

a poppet comprising:
- a poppet head configured to rest within the poppet seat;
- a seal channel extending into the poppet head;
- a resilient member extending from the poppet head through the central bore; and
- a hook extending from the resilient member;

an o-ring disposed within the seal channel; and a valve spring disposed between the hook and the shoulder.

* * * * *